US012659188B2

(12) United States Patent
Rehm et al.

(10) Patent No.: US 12,659,188 B2
(45) Date of Patent: Jun. 16, 2026

(54) APPARATUS FOR SECURED COMMUNICATION BETWEEN CONTROL DEVICES IN A VEHICLE, ELECTRONIC PROCESSING UNIT, AND VEHICLE

(71) Applicant: ZF CV Systems Global GmbH, Bern (CH)

(72) Inventors: Florian Rehm, Wennigsen (DE); Christian Urban-Seelmann, Neustadt (DE)

(73) Assignee: ZF CV Systems Global GmbH, Bern (CH)

( * ) Notice: Subject to any disclaimer, the term of this patent is extended or adjusted under 35 U.S.C. 154(b) by 32 days.

(21) Appl. No.: 18/576,523

(22) PCT Filed: Jun. 21, 2022

(86) PCT No.: PCT/EP2022/066857
§ 371 (c)(1),
(2) Date: Jan. 4, 2024

(87) PCT Pub. No.: WO2023/280563
PCT Pub. Date: Jan. 12, 2023

(65) Prior Publication Data
US 2024/0291687 A1     Aug. 29, 2024

(30) Foreign Application Priority Data
Jul. 7, 2021     (DE) ..................... 10 2021 117 500.3

(51) Int. Cl.
*H04L 12/40*          (2006.01)
*H04L 9/40*           (2022.01)

(52) U.S. Cl.
CPC .... *H04L 12/40104* (2013.01); *H04L 63/0236* (2013.01); *H04L 2012/40215* (2013.01); *H04L 2012/40273* (2013.01)

(58) Field of Classification Search
CPC ..... H04L 12/40104; H04L 2012/40215; H04L 2012/40273; H04L 63/0236
(Continued)

(56) References Cited

U.S. PATENT DOCUMENTS

2009/0082912 A1*   3/2009   Melman .................. B60T 8/885
                                                          701/1
2013/0227648 A1*   8/2013   Ricci ................... H04W 12/088
                                                          726/3

(Continued)

FOREIGN PATENT DOCUMENTS

CN          111108724 A      5/2020
CN          111385286 A      7/2020
(Continued)

OTHER PUBLICATIONS

Rizvi et al., Protecting an automobile network using distributed firewall system, In Proceedings of the Second International Conference on Internet of Things, Data and Cloud Computing, pp. 1-6 (2017) (Year: 2017).*
(Continued)

*Primary Examiner* — David P Zarka
(74) *Attorney, Agent, or Firm* — Dickinson Wright PLLC

(57) ABSTRACT

An apparatus is provided for secured communication between control units in a vehicle (20). The control units have at least one communication interface (IT1) connected to a first part of a wired vehicle bus system (B1) for exchanging messages. At least one secured control unit (CU4, CU5) is connected to the vehicle bus system (B1), wherein the secured control unit (CU4, CU5) has at least one further communication interface (IT2), to which a separate part of the vehicle bus system (B1') is connected. The secured control unit (CU4, CU5) has a gateway function (GWF) and security equipment (SE) which fulfills at least the function of a firewall (FW) that is used to ward off
(Continued)

attacks on one of the control units in the separate part of the vehicle bus system (B1') from the first part of the vehicle bus system (B1).

17 Claims, 6 Drawing Sheets

(58) Field of Classification Search
USPC .......................................................... 726/11
See application file for complete search history.

(56) References Cited

U.S. PATENT DOCUMENTS

| | | | | |
|---|---|---|---|---|
| 2014/0226673 A1* | 8/2014 | Hirashima | .......... | H04L 12/4625 |
| | | | | 370/401 |
| 2014/0259143 A1* | 9/2014 | Kuhnl | ................ | H04L 63/0209 |
| | | | | 726/11 |
| 2017/0093866 A1* | 3/2017 | Ben-Noon | .......... | H04W 12/068 |
| 2018/0062996 A1* | 3/2018 | Lei | .......................... | H04W 4/40 |
| 2018/0205703 A1* | 7/2018 | Grau | .................. | H04L 63/0209 |
| 2019/0064321 A1* | 2/2019 | Obuchi | ..................... | G01S 7/41 |
| 2019/0173862 A1* | 6/2019 | Kim | ........................ | H04L 9/083 |
| 2019/0268376 A1 | 8/2019 | Park et al. | | |
| 2019/0356574 A1* | 11/2019 | Schoch | ................... | H04W 4/48 |
| 2020/0374151 A1* | 11/2020 | Meier | .................... | H04L 12/40 |
| 2021/0294677 A1* | 9/2021 | Leme | .................... | G06F 9/4451 |
| 2022/0169271 A1* | 6/2022 | Guérin | ................. | B60W 50/12 |
| 2022/0284105 A1* | 9/2022 | Krishnegowda | .... | G06F 13/1668 |

FOREIGN PATENT DOCUMENTS

| | | | | | |
|---|---|---|---|---|---|
| DE | 102011084254 A1 | | 4/2013 | | |
| DE | 102017202022 A1 | | 8/2018 | | |
| EP | 1473614 A2 | * | 11/2004 | ......... | H04L 63/0263 |
| EP | 3148154 A1 | | 3/2017 | | |
| WO | 2020187985 A1 | | 9/2020 | | |

OTHER PUBLICATIONS

European Patent Office, Rijswijk, Netherlands, International Search Report of International Application No. PCT/EP2022/066857, Mailed Oct. 6, 2022, 2 pages.

* cited by examiner

APPARATUS FOR SECURED COMMUNICATION BETWEEN CONTROL DEVICES IN A VEHICLE, ELECTRONIC PROCESSING UNIT, AND VEHICLE

FIELD

The present disclosure relates to the technical field of cyber security for vehicles, in particular commercial vehicles.

BACKGROUND

More and more electronic components that can exchange messages with each other are being integrated into vehicles. For this purpose, various communication networks are formed and are provided with gateways that connect the various communication networks to each other. They are used to carry out the format conversion so that messages in the format of one communication network are converted into the format of the other communication network and vice versa, so that the messages from the electronic components in one communication network are also understood by the electronic components in the other communication network and vice versa. In some cases, however, control units that use the communication bus very heavily are also networked in a separate branch, even though the same bus system is used, and no format conversion is required for this branch. The term "cyber security" is intended to be used to address various aspects of data security in the "digital age". This includes, among other things, the aspect of network security. Here it is particularly important to ward off attacks on the communication network from outside and inside. The attack possibilities are as diverse as the networks themselves.

While, in the case of attacks on stationary computer networks, it is often a matter of protecting the confidential data stored there and preventing the introduction of malware, it is a matter, in the case of attacks on communication networks in vehicles, of preventing the introduction of false control commands and false diagnostic commands, in particular. How vulnerable communication networks in vehicles can be was particularly impressively demonstrated by a group of hackers who carried out a hacker attack on a vehicle while the vehicle was in operation in 2015. During this demonstration, false control commands were introduced and were used to tamper with a BCM module, corresponding to the body control module, of the vehicle. The window lifters were actuated while driving and the windows were lowered at full speed. Worse attacks were also carried out. The brakes, the air conditioning system, the instrument cluster and the infotainment system were deactivated and the steering was controlled remotely. There are therefore efforts to secure the communication networks in vehicles.

US 2013 227 648 A1 discloses the practice of providing a gateway in a vehicle in order to ward off attacks from outside. This gateway is used for external communication. This gateway is equipped with a firewall. The firewall can be an authentication means that uses a public key infrastructure (PKI) and authenticates the communication partner, for example, on the basis of a symmetric or asymmetric key exchange. The firewall can block the transmission of malicious information that is not authenticated, and can output a warning message if malicious information has been transmitted.

US 2019 268 376 A1 discloses the practice of providing a gateway with firewall for the external data traffic and a gateway with firewall for the internal data traffic. The firewall of the external gateway secures the data traffic with communication partners outside the vehicle. All messages coming from outside are checked and forwarded to the internal gateway. All messages that come from control units in the vehicle and are intended to be sent to the outside are also checked by the firewall of the external gateway. The internal gateway can transmit the information transmitted from the external gateway to an internal electronic control unit via an internal network or support communication between various internal electronic control units. In this case, the internal gateway is used only for security verification.

US 2014 226 673 A1 discloses the practice of providing a connection for a workshop diagnostic tester on the onboard gateway device. This gateway device is also used to authenticate the diagnostic tester at the time of establishing the connection between the diagnostic tester and the vehicle and to transmit the communication between the diagnostic tester and the onboard devices if the authentication is successful. This gateway device is also equipped with a firewall.

The type of falsification of messages containing control commands or sensor data is very closely linked in the vehicle sector to the communication protocol used to transmit such messages. By far the most common communication protocol used in vehicles is the CAN bus communication protocol. The CAN bus, corresponding to the Controller Area Network, has already been used in vehicles since 1991. The CAN bus communication protocol was standardized in 1994 and the ISO standard is ISO 11898. Further variants of this bus system were standardized later. However, this CAN bus communication protocol is vulnerable to attacks based on the introduction of messages. Such attacks are also known as "spoofing". The term "spoofing" refers to the falsification of sender addresses in order to disguise the origin of packets.

However, no sender addresses are sent in the CAN bus communication protocol. However, it would be possible to introduce messages if the attacker managed to gain logical access to the bus line. A twisted two-wire line without shielding is used as the physical transmission medium for the CAN bus. If an attacker succeeds in connecting his manipulated device to this bus line, it is easy to introduce additional (manipulated) messages. However, this would also be possible if, as shown during the demonstration in 2015, the messages were introduced via the so-called air interface. This is an onboard communication module used for external communication. It can be a 5G, LTE, or WIFI modem, etc. Typically, the air interface is connected to a gateway module connected to the one or more vehicle communication buses.

This vulnerability of the CAN bus system has been addressed in the recent past by the development of secured CAN transceivers.

One such CAN transceiver is known from EP 3 148 154 B1. A monitoring module is used to check whether the identifier of a received CAN message matches an identifier reserved for the bus station. This checks whether the uniqueness rule for CAN message identifiers that is valid for the CAN bus is violated. If violation of the uniqueness rule has been determined, an attack on the bus system is inferred and the received CAN message that violates the uniqueness rule is declared invalid while it is still being received. This is done by sending an error flag in the end of frame field of the received CAN message. If the other bus subscriber stations detect the error flag, they must reject the received message as invalid. This prevents the execution of any control command contained in the message, and this message can therefore no longer cause any damage.

WO 2020 187 985 A1 discloses an extension for secured CAN transceivers, in which other countermeasures are suggested.

One problem, however, is that series products for the vehicle sector are typically developed for a period of 10 to 15 years. This means that control units are still used in new vehicles that are not equipped with a secured CAN transceiver. These are still vulnerable to introduced messages. Manufacturers of commercial vehicles in particular are using long-term product generations. The product cycles can be more than 15 years in this case.

However, the legislator has now stipulated that from 2024 onward, new vehicles that do not comply with the UN-ECE R155 directive may no longer be registered in the EU. It requires vehicle manufacturers to provide countermeasures for cyber attacks in their vehicle network architectures. In other regions of the world, the corresponding UN-ECE member states must also take such precautions.

While all suppliers and commercial vehicle manufacturers will strive to provide maximum security against the known cyber attacks, it is not a realistic scenario that new product generations will have been developed, tested and certified by 2024 for all electronic control units, sensors and actuators used in commercial vehicles, and that by then the production facilities will have already been converted to the new product generations. In addition, customized network architectures must also be developed, tested and produced for the new electronic components.

Although it is possible to ward off external attacks via the air interface with a specifically developed specially secured gateway device, this does not apply to attacks that come from the inside by an attacker gaining access to the bus line and connecting a manipulated electronic device. However, such attacks are especially possible in the commercial vehicle sector, since the vehicles are traveling over long distances where they cannot be parked at night in protected depots. In addition, it is even easier to tamper with trailer vehicles. They also contain electronic components, such as brake control units and sensors and actuators, which are connected to a so-called trailer CAN bus. When coupled to the towing vehicle, this is connected to the T-CAN connection of the towing vehicle. In this way, a connection to the vehicle bus of the towing vehicle is then established. If a manipulated electronic device is connected to the trailer CAN bus, it can then introduce manipulated messages onto the vehicle bus of the towing vehicle. It is possible to use another gateway device to ward off such introduced messages, but it increases the costs considerably.

There is therefore a need for alternative safeguards which can be used at least for a transitional period and which meet the criteria of the UN-ECE R155 directive. The aim of the present disclosure is to provide an effective alternative solution that makes it possible to use a mix of electronic components of existing product generations and secured electronic components of newer product generations in a customized network architecture. The aim of this solution is also to reliably detect unauthorized bus access and to prevent the manipulated messages from causing damage.

It is therefore the object of the present disclosure to find a network architecture for the use of an electronic device not yet equipped with a secured CAN transceiver or Secure Onboard Communication (SecOC), which meets the requirements according to the applicable UN-ECE R155 directive.

This object is achieved by an apparatus for secured communication between control units in a vehicle, by an electronic control unit, and/or by a vehicle as described herein.

The present disclosure includes advantageous developments and improvements of the present disclosure according to the following description of these measures.

In one embodiment, the present disclosure relates to an apparatus for secured communication between control units in a vehicle, wherein the control units are each equipped with at least one communication interface, via which they can be connected to a first part of a wired vehicle bus system for the purpose of exchanging messages. At least one secured control unit is provided and is connected to the vehicle bus system. This secured control unit is provided according to the special network architecture with at least one further communication interface, to which a part of the vehicle bus system is connected, to which at least one control unit that does not contain a defensive measure against introduced messages is connected. In this case, the secured control unit is provided with a gateway function and security equipment which fulfills at least the function of a firewall that is used to ward off attacks on one of the control units in the separate part of the vehicle bus system from the first part of the vehicle bus system. This solution has the advantage that the so-called legacy control units, which are still not equipped with a secured CAN transceiver or secured onboard communication, continue to remain usable. Although they are vulnerable to introduced messages, they are protected by the upstream connection of an already secured control unit which intercepts the messages introduced in the first part of the vehicle bus system and renders them harmless. It is thus possible to use a mix of secured and vulnerable control units in a vehicle communication bus system, while complying with the protection against cyber attacks required by the directive. This solution also offers the potential for cost savings because it is not necessary to use an additional separate gateway device to protect the legacy control units. Instead, this task is taken over by a newly developed control unit equipped with a secure CAN transceiver. However, this control unit must have sufficient computing capacity to be able to additionally perform the gateway function and the firewall function.

The gateway function of the secured control unit advantageously relates particularly to the routing of the messages between the subscribers in the first and the second part of the vehicle bus system.

The advantages of the present disclosure come into effect, in particular, when the wired vehicle bus system corresponds to a CAN bus system, corresponding to a Controller Area Network, in particular in the variant according to the SAE J1939 standard. Here, the problem of the vulnerability to introduced messages exists especially because the CAN messages are sent in content-addressed form. This means that the messages are not provided with a sender address and a destination address, which would make it even easier to check messages that have been introduced. Instead, a so-called message identifier is sent at the beginning of the message and also identifies the content of the message. All stations of the CAN bus system can use this to identify whether they need the message. However, the control units not equipped with secured CAN transceivers cannot use this to identify whether the message was introduced or actually sent from the original control unit.

It is therefore advantageous that the control units in the first part of the vehicle bus system are equipped with a secured CAN bus communication interface, wherein the secured CAN bus communication interface is designed in such a way that it can detect introduced messages from a manipulated control unit in the first part of the vehicle bus system and can render them harmless. For this purpose, such secure CAN transceivers are already offered on the market. The CAN transceivers of the Stinger type from NXP Semiconductors N.V. are mentioned as an example. It is also possible to secure communication with an additional software stack that supports secured onboard communication.

In one embodiment of the present disclosure, the secured control unit is a brake control unit EBS, corresponding to an "Electronic Braking System", and the at least one control unit (legacy control unit) moved into the other part of the vehicle bus system concerns a driver assistance system control unit or an environment capture system control unit, to which at least one environment capture sensor such as a camera, radar, lidar, ultrasound or IR camera is connected. In this case, two or more legacy control units can also be arranged in the second part of the vehicle bus system. This has the advantage that a plurality of control units of an older product generation can be reused.

In another embodiment, the present disclosure relates to an electronic control unit having a first communication interface, via which the control unit can be connected to a first part of a wired vehicle bus system for the purpose of exchanging messages. This control unit is distinguished by the fact that it has at least one further communication interface, to which a separate part of the vehicle bus system can be connected, wherein the control unit is provided with a gateway function and security equipment which fulfills at least the function of a firewall for the purpose of warding off attacks on one of the control units in the unsecured part of the vehicle bus system from the first part of the vehicle bus system. A control unit equipped in this manner can be used to advantageously implement the special network architecture described in the first embodiment of the present disclosure.

For further protection of the vehicle bus system, it is advantageous if the security equipment for the electronic control unit relates to the function of a secured boot operation. This measure is used to monitor the individual steps during the boot operation. It is therefore even possible to ensure that only the cryptographically signed boot loader, for which the certificates are stored in the hardware security module, is started in the control unit. These are stored there securely and are safe from manipulation. This can be used, for example, to block malicious bootloader programs that have been subsequently loaded into the control unit by manipulation.

In this case, the gateway function of the control unit should advantageously relate to the routing of the messages between the subscribers in the first and the separate part of the vehicle bus system.

It is particularly advantageous if the first communication interface and at least one further communication interface of the electronic control unit corresponds to a CAN bus communication interface, corresponding to a Controller Area Network, in particular in the variant according to the SAE J1939 standard. As described, the CAN bus is vulnerable to attacks from introduced messages. Therefore, it is all the more important to provide the electronic control unit with security equipment precisely for this type of communication bus.

It is very advantageous in this regard that the CAN bus communication interface for connection to the first part of the vehicle bus system is equipped with a secured CAN transceiver which can ward off attacks based on introduced messages from a manipulated control unit in the first part of the vehicle bus system. As described, such secured CAN transceivers are available on the market.

It is also advantageous that the security equipment further has a function for certificate-based authentication of an external diagnostic tester connected to a control unit or a gateway device of the first part of the vehicle bus system. This is even urgently needed to prevent malware from being loaded onto the control unit with a manipulated diagnostic tester.

For the same purpose, it is advantageous if the security equipment relates to an HSM module, corresponding to a Hardware Security Module, for ensuring secure authentication at least of the external diagnostic tester connected to a control unit of the first part of the vehicle bus system. Keys and certificates used for authentication can be stored securely in the HSM module. The HSM module can also contain a computing unit that is needed to securely perform cryptographic calculations such as hash algorithms, key derivations, encryption and decryption algorithms, calculations of signatures, calculations of random numbers, calculations for authentication and identification, etc.

While the diagnostic tester can be authenticated by the secured control unit with strong certificate-based authentication, this is not possible for the legacy control unit moved into the separate part of the vehicle bus system, since it is not equipped with the corresponding algorithms, let alone the HSM module. Here, it is then advantageous that the security equipment of the secured control unit further has the function of a diagnostic client control unit for "seed key" authentication of a control unit connected to the separate part of the vehicle bus system with regard to the execution of diagnostic functions which are called up by communicating with the external diagnostic tester verified by certificate. It is then also possible for the diagnostic tester to read out the error memory entries in the legacy control units, because the secured control unit supports these diagnostic functions after the diagnostic tester has been securely authenticated.

In a further configuration of the present disclosure, it is advantageous that the security equipment further has the function of preventing certain diagnostic commands which are classified as dangerous, arrive from the external diagnostic tester and are addressed to the control unit to be tested in the unsecured part of the vehicle bus system. Such dangerous diagnostic commands are in particular commands with regard to the reading and writing of memory areas allocated for the execution of computer programs in the control unit to be tested or for the permanent storage of computer programs in non-volatile memory areas.

In a particularly secure configuration of the present disclosure, the security equipment further has the function of verifying the incoming diagnostic commands, individually or in groups, by carrying out the certificate-based authentication of the external diagnostic tester again in each case before the relevant diagnostic command is forwarded to the control unit to be tested in the unsecured part of the vehicle bus system. However, this has the disadvantage that the period needed to perform the test is extended.

In addition, the security equipment in the secured control unit may further have the function of a secured software update process in which the computer programs stored in the non-volatile memory area can be exchanged. The measure can involve, for example, providing the computer program to be loaded with a digitally signed hash code which is checked in the control unit before the program is written to the non-volatile memory. Otherwise, this option of the software update should be blocked, since it would otherwise be possible to load malware into the non-volatile memory area.

Three possible variants of the implementation of the present disclosure involve providing a brake control unit EBS, corresponding to an "Electronic Braking System", or a control unit for a distance control system or a control unit for an automatic driving system with the security equipment according to the present disclosure.

A further embodiment of the present disclosure includes a vehicle having a drive unit and an electronically controlled braking system, which has an apparatus according to the present disclosure.

BRIEF DESCRIPTION OF THE DRAWINGS

Exemplary embodiments of the present disclosure are illustrated in the drawings and are explained in more detail below with reference to the figures, in which.

DETAILED DESCRIPTION

The present description illustrates the principles of the present disclosure. It is therefore understood that experts will be able to design various arrangements which, although not explicitly described here, embody principles of the present disclosure and are also intended to be protected in terms of their scope.

Figure 1:
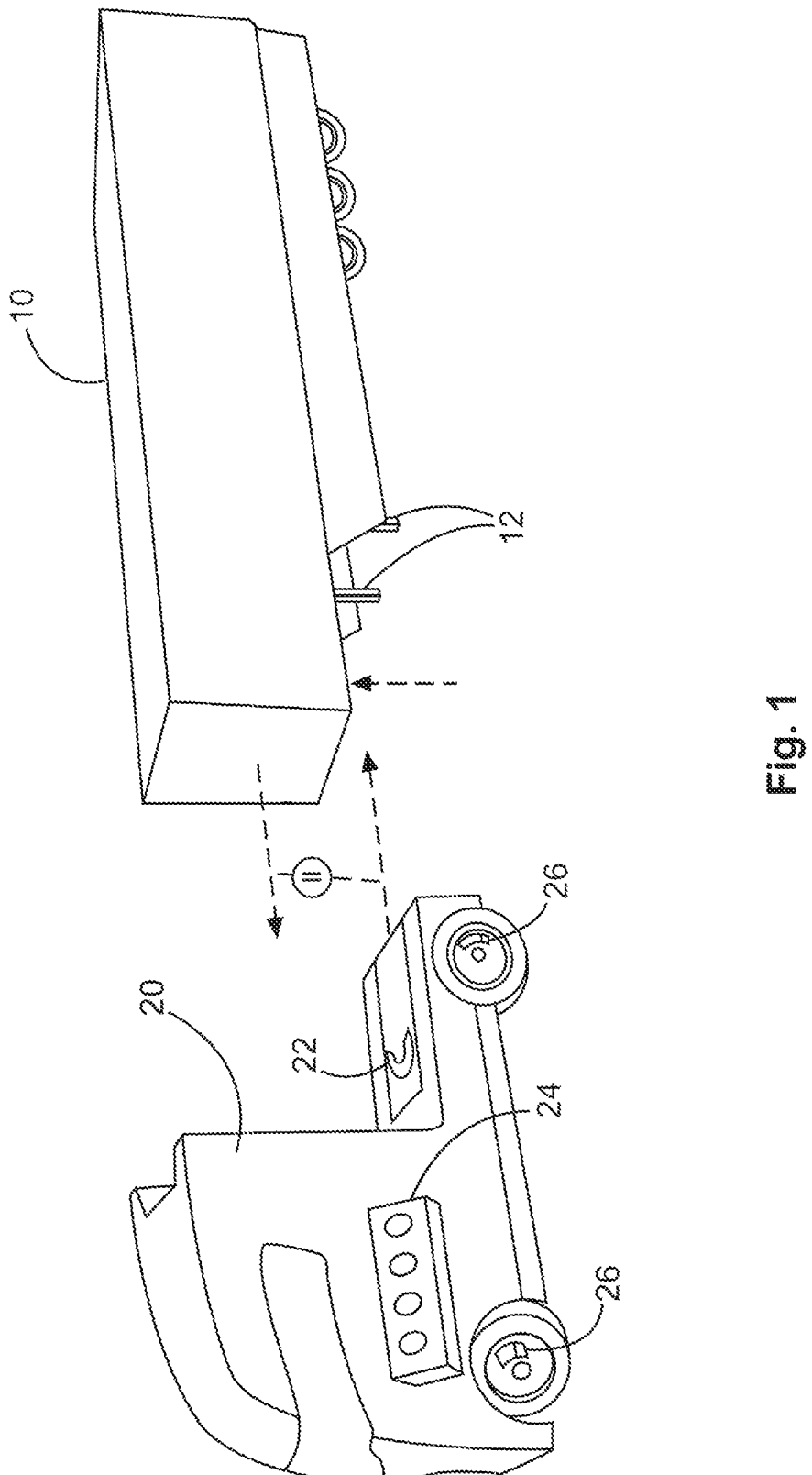
FIG. 1 shows a towing vehicle and a trailer vehicle ready to be picked up in the form of a semi-trailer.

FIG. 1 shows a towing vehicle 20 aligned with a trailer vehicle 10 that is ready to be picked up. The term trailer vehicle 10 is understood here as meaning a trailer vehicle which is equipped with a coupling system for a towing vehicle 20. They are mainly commercial vehicle trailers. These are often equipped, as a semi-trailer vehicle, with a coupling system in which a so-called kingpin of the trailer vehicle 10 is guided into a top plate 22 of the towing vehicle until it clicks into place, whereby a rotatable connection between the towing vehicle 20 and the trailer vehicle 10 is created. However, they can also be other trailer vehicles, such as trailer vehicles used in agriculture or trailer vehicles that are attached to construction vehicles. Larger caravans as well as recreational and sports trailers are also considered.

The towing vehicle 20 may be a typical towing vehicle 20. It is mainly a commercial vehicle. Here, too, other towing vehicles are also considered. Towing vehicles used in agriculture or construction vehicles or camping vehicles are mentioned as further examples. Finally, it is mentioned that the list is not a definitive list. Thus, automobiles which can also be equipped with the subject matter of the invention are also used as towing vehicles. The term towing vehicle is also used here only as an example. The invention may also be used in other vehicles which are not used as towing vehicles. These also include buses and construction and harvesting machines, as well as motorcycles, robots, aircraft and drones.

The towing vehicle 20 is equipped with a drive unit 24 which corresponds in the form illustrated to an internal combustion engine. Of course, other types of drive units can also be integrated into the towing vehicle. Electric motors and fuel cells are mentioned as a further example. At the wheels of the towing vehicle 20, the service brakes 26 are also highlighted.

Figure 2:
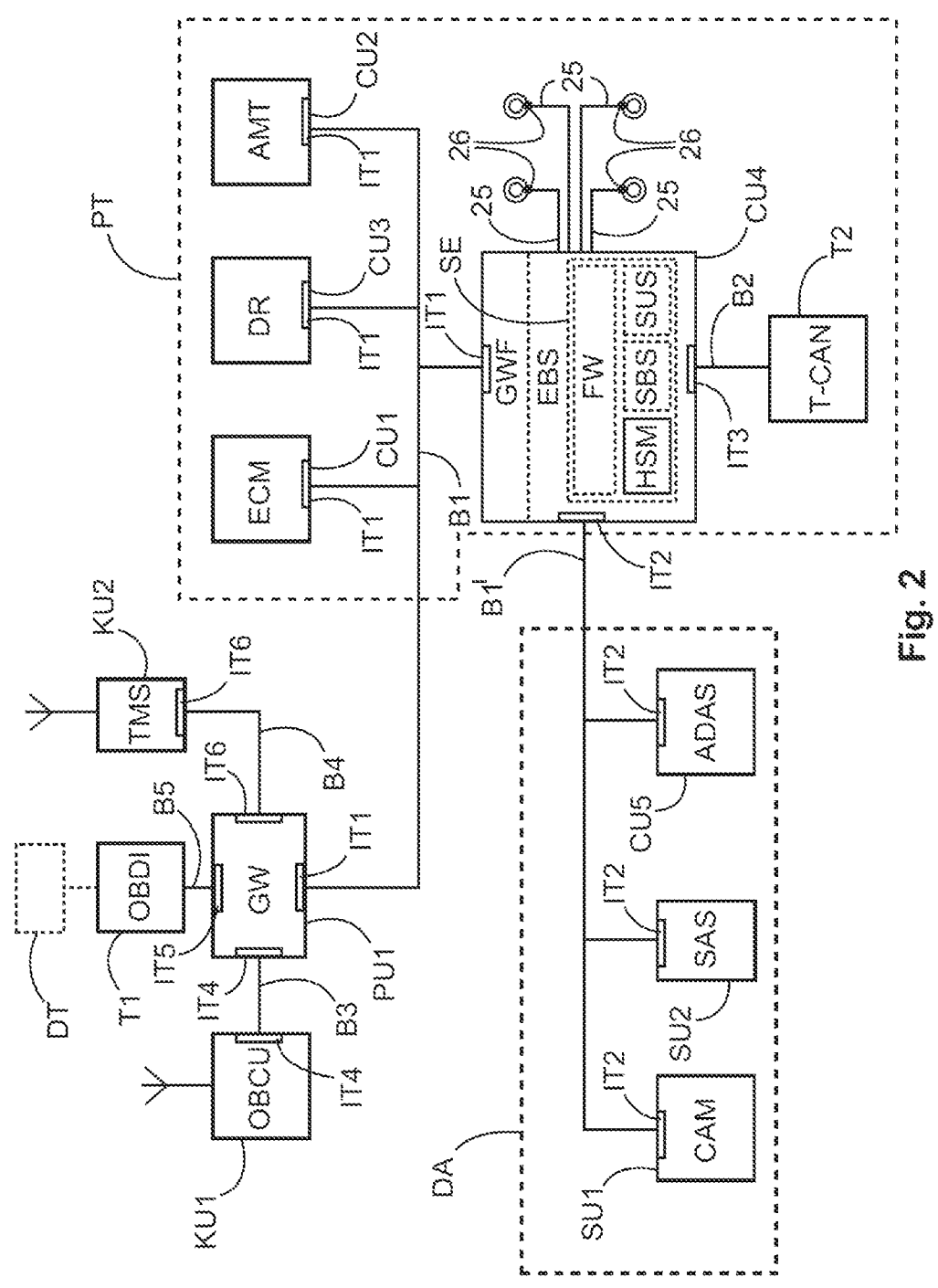
FIG. 2 shows a first block diagram for the electronic equipment of a towing vehicle.

FIG. 2 shows the structure of an exemplary vehicle electronic system of the towing vehicle 20. The electronic control units of a drive train PT and the electronic control units of a driver assistance system train DA are shown. In addition, a gateway PU1 with connected onboard communication devices KU1 and KU2 is also shown. The onboard communication device KU1 can be in the form of an LTE or 5G modem or a WLAN module. This is used to communicate with devices that are connected to the Internet or another public communication network. Data traffic to other vehicles, also called V2V communication, corresponding to vehicle-to-vehicle, or to infrastructure devices that are stationary, corresponding to V2X communication, is also handled via said communication device. For this purpose, the so-called "Sidelink" communication capability of the LTE modem or the so-called "PC5" communication capability of the 5G modem can be used for communication with other vehicles. V2X communication, corresponding to vehicle-to-everything, can also be handled via a WLAN module.

The onboard communication device KU2 supplies the towing vehicle 20 with telematics data. These include, for example, the well-known applications from the logistics sector, such as toll collection, but also data that serve to control the flow of traffic. For example, it can be a GSM module. A connection T1 for a workshop diagnostic tester T1 is also connected to the central gateway PU1. Yet further electronic components which are not illustrated in FIG. 2 can also be connected to the central gateway PU1. The electronic devices of an infotainment system are mentioned as an example. These include, for example, the navigation device, radio, telephone, and a touchscreen display device for operation by the driver and for informing the driver. A so-called body control module can also be connected to the gateway PU1. This is used to receive and implement the various settings of components that can be operated by the driver. The windshield wipers, the windshield washer system, the door locks, the various lamps and turn signals, the window regulators, the seat adjustment motors, the air conditioning system, etc. are mentioned here as examples.

The drive train PT includes various electronic control units. The block CU1 denotes an electronic engine controller. The block CU2 denotes an automatic transmission control unit. The block CU3 denotes an electronic control unit of the retarder unit. This is used to support a braking operation and can prevent overheating of the friction brakes 26 on the wheels. The block CU4 denotes an electronic brake control unit EBS, corresponding to an "Electronic Braking System". The reference number 26 is used to denote one service brake per wheel in each case. Each service brake 26 can be actuated separately by the electronic brake control unit CU4. For this purpose, the corresponding brake lines 25 are connected to the electronic brake control unit EBS.

The reference sign DA marks a driver assistance system train in FIG. 2. The block CU5 denotes an electronic control unit of a driver assistance system ADAS, corresponding to an "advanced driving assistance system". It is an adaptive distance control system that automatically maintains the distance to the vehicle in front. It measures the distance to the vehicle in front and sends control commands to the control units of the drive train in order to brake the vehicle if the distance to the vehicle in front decreases, or in order to accelerate the vehicle if the distance to the vehicle in front increases. The special feature of the electronic control unit CU5 is that it has already integrated the radar sensor for measuring the distance. In another embodiment, the control unit CU5 may not be equipped with an integrated radar sensor. The radar sensor would then have to be connected to the control unit CU5, like the camera SU1 illustrated. The camera SU1 serves as a further environment capture sensor. It can help to determine the objects in the environment more accurately. This can also help to discern whether the measured distance values are reliable. If a stereo camera is used, it can also be used to determine the distance. Then there is also the possibility of increasing the distance measurement accuracy. For this purpose, the electronic control unit CU5 may include a computing unit that performs a sensor fusion with the distance values provided by the radar sensor and the distance values provided by the stereo camera SU1. The reference sign SU2 is used to denote a steering angle sensor. This is attached to the steering system, but is also connected to the driver assistance system with an additional cable, so that the driver assistance system can determine the distance more accurately when accordingly cornering.

The electronic control units CU1 to CU4 and the gateway module PU1 are networked with each other via a bus system B1. A bus system designed for in-vehicle communication can be used for this purpose. Serial bus systems are typically used for this purpose, since they require the least amount of cabling. Possible examples are a CAN bus system, corresponding to a Controller Area Network. There are different variants of the CAN bus system such as CAN Low Speed and CAN High Speed for different data rates of 125 kbit/s and 1000 kbit/s. Furthermore, an extended CAN bus was specified under the name CAN-FD bus, where FD stands for "Flexible Data Rate". This specification defines an extended data frame with a higher transport capacity where the payload field is enlarged. The bus architecture is illustrated in FIG. 2 for the bus B1 in such a way that a common bus line is used. Each device connected to this bus B1 is equipped with a communication interface IT1. If the bus system concerns the CAN bus, a communication interface IT1 is accordingly used for the CAN bus.

The bus system B1 is typically in the form of a CAN bus and is referred to as a vehicle bus. The vehicle bus is a special CAN bus which is then designed in the variant according to the SAE J1939 standard. The SAE standards are issued by the SAE organization, corresponding to the Society of Automotive Engineers.

The gateway module PU1 is also equipped with the communication interface IT1. For communication with the onboard communication device KU1, the gateway device PU1 is equipped with a communication interface IT4. For communication with the onboard diagnostic interface T1, the gateway device PU1 is equipped with a communication interface IT5. For communication with the telematics unit T1, the gateway device PU1 is equipped with a communication interface IT6.

The components CU5, SU1 and SU2 of the driver assistance system train DA are networked via the communication bus B1'. This communication bus B1' can also be in the form of a CAN bus. Alternatively, it can be in the form of a CAN-FD bus. The electronic control unit CU4 is equipped with an additional communication interface IT2 for this purpose. The components CU5, SU1 and SU2 are also equipped with the communication interface IT2. If the bus B1' is also in the form of a CAN bus, the communication interface IT2 is also designed as a CAN bus interface. Yet another communication bus B2 is connected to the electronic control unit CU4. This is connected to a connection socket T2. When coupling a trailer vehicle 10, this is used to receive the corresponding plug of the communication bus of the trailer vehicle 10. The electronic control unit CU4 is provided with the communication interface IT3 for this purpose. The bus B2 can also be in the form of a CAN bus, with the result that the communication interface IT3 could also be designed as a CAN bus interface. The electronic control unit CU4 is provided with a gateway function GWF and security equipment SE. This consists of a hardware security module HSM, a firewall FW, a secure boot loader SBS and a secure update loader SUS. The HSM module, as already mentioned, is used to securely store cryptographic information such as passwords, key information and certificates and to securely execute cryptographic computing operations such as the calculation of a key on the basis of seed key information, e.g. in the secure Diffie-Hellman key exchange method, the calculation of a hash value, the execution of encryption or decryption algorithms, etc. The HSM module HSM is safe from tampering, since it is implemented with hardware and cannot be reprogrammed.

The task of the firewall FW is to monitor the data traffic via the various communication bus connections. The firewall is implemented with software and is used to restrict network access. It monitors the data traffic passing through the firewall and uses established rules to decide whether or not certain network packets are allowed to pass through. In this way, it attempts to prevent unauthorized network access. The number and type of established rules are decisive in determining the degree of security that can be achieved. Further details on the use of the security equipment SE are explained in more detail below using the description of FIG. 7.

Figure 3:
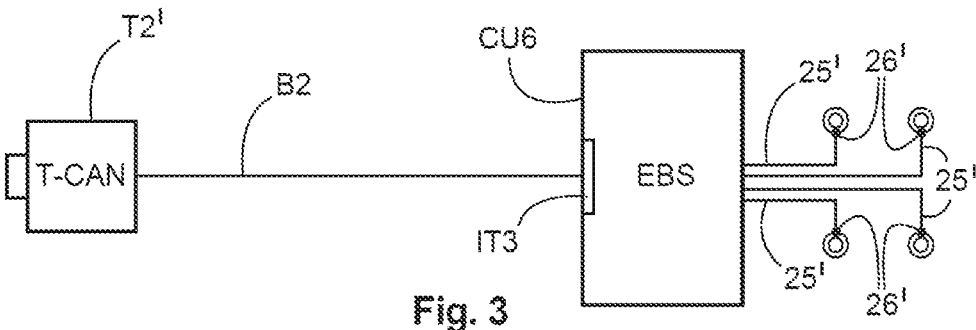
FIG. 3 shows a block diagram for the electronic equipment of a trailer vehicle.

FIG. 3 shows a block diagram of the electronic system of a trailer vehicle 10. The reference sign CU6 denotes a brake control unit for the trailer vehicle 10. This controls the service brakes 26' of the wheels of the trailer vehicle 10 in the same way as the brake control unit CU4. However, this brake control unit CU6 is in the form of a legacy control unit and therefore does not include the security equipment, like the control unit CU4, and does not include a gateway function. The brake lines of the trailer vehicle 10 are denoted using the reference sign 25'. The reference sign B2 denotes the communication bus of the trailer vehicle 10. T2' is used to denote the connection plug for plugging into the connection socket T2 of the connection bus B2 of the towing vehicle 20. This is inserted into the connection socket T2 of the connection bus B2 of the towing vehicle 20 when coupling the trailer vehicle 10. Typically, the connection bus B2 is also designed as a CAN bus. The brake control unit CU6 is therefore equipped with a communication interface IT3 which can also be a CAN bus interface.

Figure 4:
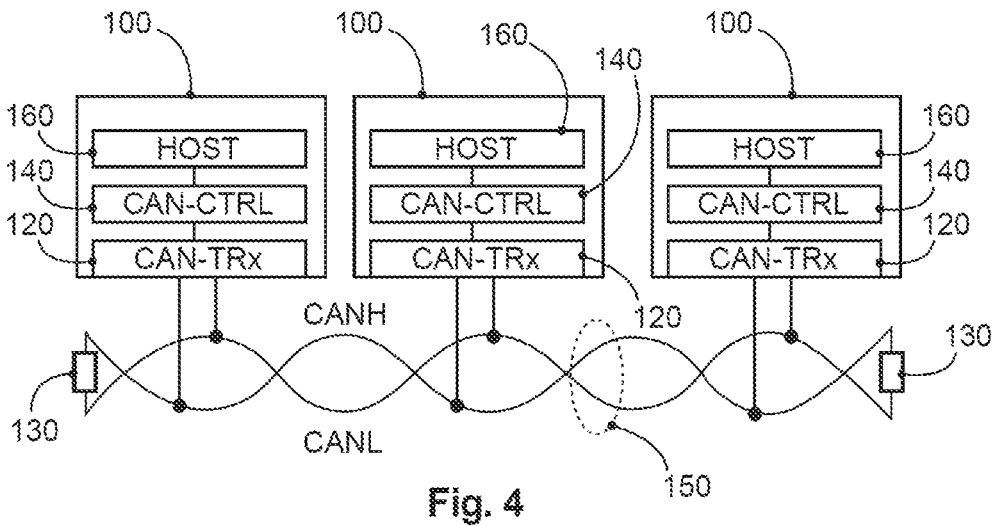
FIG. 4 shows the principle of networking electronic components by way of a CAN bus.

FIG. 4 shows the principle of networking electronic components by way of a CAN bus. A CAN network is a system network consisting of CAN nodes (electronic components (control units, sensors, actuators) with a CAN interface) that exchange data with each other via their respective CAN interfaces and a transmission medium (bus line) connecting all CAN interfaces. Three CAN nodes 100 are illustrated. The bus structure of the CAN bus is linear. There is therefore a bus line 150, to which all three CAN nodes 100 are connected. In the most common applications, a twisted, unshielded two-wire line (Unshielded Twisted Pair—UTP) is used as the bus line 150 and is used for symmetrical signal transmission. In symmetrical signal transmission, the signals are transmitted as voltage differences over two lines. The line pair consists of a non-inverted signal line CANH and an inverted signal line CANL. The receivers reconstruct the original data signal from the difference between the signals present on these two conductors. This has the advantage that common-mode interference that occurs on both conductors of the bus line 150 is extinguished by the formation of differences and thus has no effect on the transmission.

In order to avoid signal reflections, the bus line 150 is terminated at both line ends with a terminating resistor RT of the magnitude of the characteristic impedance of the bus line (120 ohms). A CAN interface consists of two parts: the communication software and the communication hardware. While the communication software includes higher communication services, the basic communication functions are typically implemented in hardware: Two hardware components are distinguished here: The CAN controller 140 ensures that the CAN communication protocol is handled consistently, thereby relieving the load on the host 160, on which the already mentioned communication software runs. The CAN transceiver 120 is used to couple the CAN controller 140 to the CAN bus 150. It forms the signals for the data transmission during the transmission process and conditions the signals in the event of reception.

Figure 5:
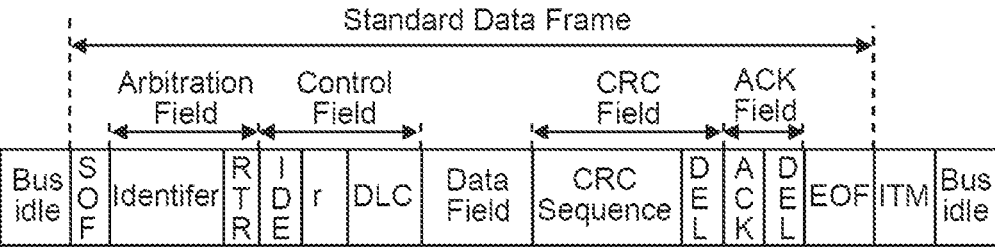
FIG. 5 shows the format of a standard data frame for transmitting a message on the CAN bus.

FIG. 5 shows the format of a standard data frame for the transmission of a message on the CAN bus.

There are many different individual bits in the ISO 11898-1 transmission frame that fulfill control purposes. The various fields and control bits of the transmission frame are listed in the following table, with their names in English. The length of the individual fields is also indicated.

TABLE 1

| Control Bit | Full name | Length |
|---|---|---|
| SOF | Start of Frame | 1 bit |
| Identifier | Identifier | 9 bits |
| RTR | Remote Transmission Request | 1 bit |
| IDE | Identifier Extension | 1 bit |
| r | Reserved Bit | 1 bit |
| DLC | Data Length Code | 4 bits |
| Data Field | Data Field | 0-8 bytes |
| CRC | CRC Sequence | 15 bits |
| DEL CRC | CRC Delimiter | 1 bit |
| ACK | Acknowledge | 1 bit |
| DEL ACK | ACK Delimiter | 1 bit |
| EOF | End of Frame Code | 4 bits |

A CAN frame contains a start-of-frame (SOF) field, an arbitration field, a control field, a data field, a cyclic redundancy check (CRC) field, an ACK field, an end-of-frame (EOF) field, and an intermission sequence (ITM) field.

The SOF field is a field that indicates the beginning of a CAN frame, i.e. the beginning of a message. The arbitration field identifies a message and assigns a priority to the message. According to the length of an identification field assigned in the arbitration field, the CAN frame is divided into a standard format and an extended format (the standard format is shown). In the standard format, the arbitration field has a length of 11 bits. For the extended format, the length of the identification field in the arbitration field is 29 bits.

The identifier determines the priority of the data frame and, together with the acceptance filtering, ensures the transmitter/receiver relationships defined in the communication matrix in the CAN network. The communication matrix defines which messages it processes for each control unit. If a message whose message identifier is not listed there is thus received, this message is rejected by the acceptance filtering and is not forwarded to the application. At the same time, the uniqueness rule mentioned at the outset must also be complied with for the CAN bus, which rule defines that one message identifier is reserved for a message of a particular control unit type and may not be assigned again for another message of another control unit.

Using the RTR bit, the transmitting station informs the receivers of the frame type (data frame or remote frame). A dominant RTR bit indicates a data frame, and a recessive bit accordingly indicates the remote frame. In addition, the arbitration field may contain a 1-bit identification extension field (IDE) to identify whether a frame has the standard format or the extended format. If the value of the IDE field is 0, this indicates the standard format. If the value is 1, this means that the extended format is present. The DLC field indicates the number of payload bytes contained in the message to the receivers. The payload bytes are transported in the data field. A maximum of eight payload bytes can be transmitted with one data frame. The payload bytes are protected against transmission errors with the aid of a 15-bit checksum transmitted in the CRC field using the cyclic redundancy check. Based on the result of the CRC check, the receivers acknowledge receipt either positively or negatively in the ACK slot. An ACK bit at the end of the message is transmitted by the CAN controllers that received the message correctly. The station that transmitted the message checks whether or not the ACK bit is present on the CAN bus. If ACK is not found, this indicates that a station could not receive the message correctly and the transmitting station can try to retransmit. The transmission of a data frame is terminated with seven recessive bits, which corresponds to the End Of Frame Code EOF.

An example of a sequence of a diagnostic process when an external diagnostic device DT is connected to the onboard electronics of the towing vehicle 20 is explained below on the basis of FIG. 7. The electronic control units involved are illustrated in the upper line of FIG. 7 and are provided with the corresponding reference sign. They are the onboard diagnostic interface OBDI which can be contained in the connection socket T1, the processing unit PU1 (gateway device), the brake control unit CU4 and the electronic control unit CU5 which is equipped with a radar sensor and controls the distance to the vehicles in front. In the first step S1, the connected diagnostic tester DT transmits a message to open a diagnostic session to the onboard diagnostic interface OBDI. The entire diagnostic session follows the diagnostic communication protocol according to the ISO standard 14229. Therefore, reference is expressly made to this standard with regard to the disclosure of the invention. This diagnostic protocol is also referred to as the Unified Diagnostic Service Protocol (UDS service for short). For the purpose of explaining the invention, special reference is made to the variant ISO 14299-1 in the version of 2020. In this variant, the opening of the diagnostic session is secured with a certificate. The message to open the diagnostic session contains the certificate used by the diagnostic device DT to authenticate itself. This certificate certifies that the certificate owner is authorized to use the diagnostic tester and is in possession of the public key necessary for secure communication as well as the necessary private key. The public key is visible in the certificate, and the private key is contained in it, but encrypted. Also included is the address of the control unit to be tested. In the case shown, the address of the control unit CU5 is indicated in the UDS message. It is therefore a legacy control unit that does not include any additional security equipment. The onboard diagnostic interface OBDI receives the message ODS and forwards it to the processing unit PU1, i.e. to the gateway device.

Figure 6:
FIG. 6 shows the message format for transmitting a message according to the diagnostic protocol UDS.

The diagnostic protocol should be supported by all control units installed in a vehicle if possible. It is then possible to test and maintain these control units. The diagnostic services take place on a different level than, for example, the CAN protocol which itself uses only the first layer, i.e. the physical layer, and the second layer, i.e. the data link layer, of the OSI reference model of data communication. The UDS service itself can be assigned in parts of the session layer and in other parts of the application layer of the OSI model. A diagnostic message is always structured in a consistent manner and is divided into an SID (Service ID) field, a parameter field and a data field. This message format is shown in FIG. 6. The SID field has a specified length of 8 bits. The parameter field has a length of 16 bits. The UDS standard allows messages with a data field of any length. The maximum size is therefore predefined by the transport protocol used in each case to transmit the UDS messages. For example, messages up to a length of 4095 bytes are permitted in the frequently used ISO transport protocol according to ISO standard ISO 15765-2.

Communication based on the diagnostic protocol works according to the request-response principle. Thus, the service requests defined in UDS can be transmitted to the control units which must support the predefined UDS services. The diagnostic tester starts the service with a request to the control unit, and the control unit returns a positive or negative response after the service has ended. If the performance of the service takes longer than the predefined time, the control unit must transmit a preliminary response (requestCorrectlyReceived-ResponsePending) at regular intervals. This confirms receipt of the request, but communicates that performance is still ongoing. This makes it possible, for example, to query and reset the error memory of the individual control units. Another UDS service concerns, for example, the firmware update of a control unit.

The UDS standard in the variant ISO 14229-1 (2018) defines 27 service requests. These diagnostic messages (request and response messages) are transmitted on the data security layer of the CAN protocol in the payload field when communication is routed over a CAN bus. If the UDS message in the lower layers is now based on the standard or extended CAN bus protocol, a protocol stack must be installed on the diagnostic tester and the control units involved, which protocol stack ensures that the data fields of a number of CAN bus messages are collected on the transport layer until the full UDS message has been transmitted. The involved control unit or the diagnostic tester can then evaluate the UDS message.

The following diagnostic service requests are specified in the UDS standard ISO 14229-1 (2018), see table 2.

TABLE 2

| SID | Service | SID | Service |
|---|---|---|---|
| 0x10 | Diagnostic Session Control | 0x31 | Routine Control |
| 0x11 | ECU Reset | 0x34 | Request Download |

TABLE 2-continued

| SID | Service | SID | Service |
|---|---|---|---|
| 0x14 | Clear Diagnostic Information | 0x35 | Request Upload |
| 0x19 | Read DTS Information | 0x36 | Transfer Data |
| 0x22 | Read Data by Identifier | 0x37 | Request Transfer Exit |
| 0x23 | Read Memory by Address | 0x38 | Request File Transfer |
| 0x24 | Read Scaling Data by Identifier | 0x3D | Tester Present |
| 0x27 | Security Access | 0x3E | Write Memory by Address |
| 0x28 | Communication Control | 0x83 | Access Timing Parameters |
| 0x29 | Authentication | 0x84 | Secured Data Transmission |
| 0x2A | Read Data by Periodic Identifier | 0x85 | Control DTC Setting |
| 0x2C | Dynamically Define Data by Identifier | 0x86 | Response on Event |
| 0x2E | Input Output Control by Identifier | 0x87 | Link Control |
| 0x2F | | 0x7F | Negative Response SID |

Figure 7:
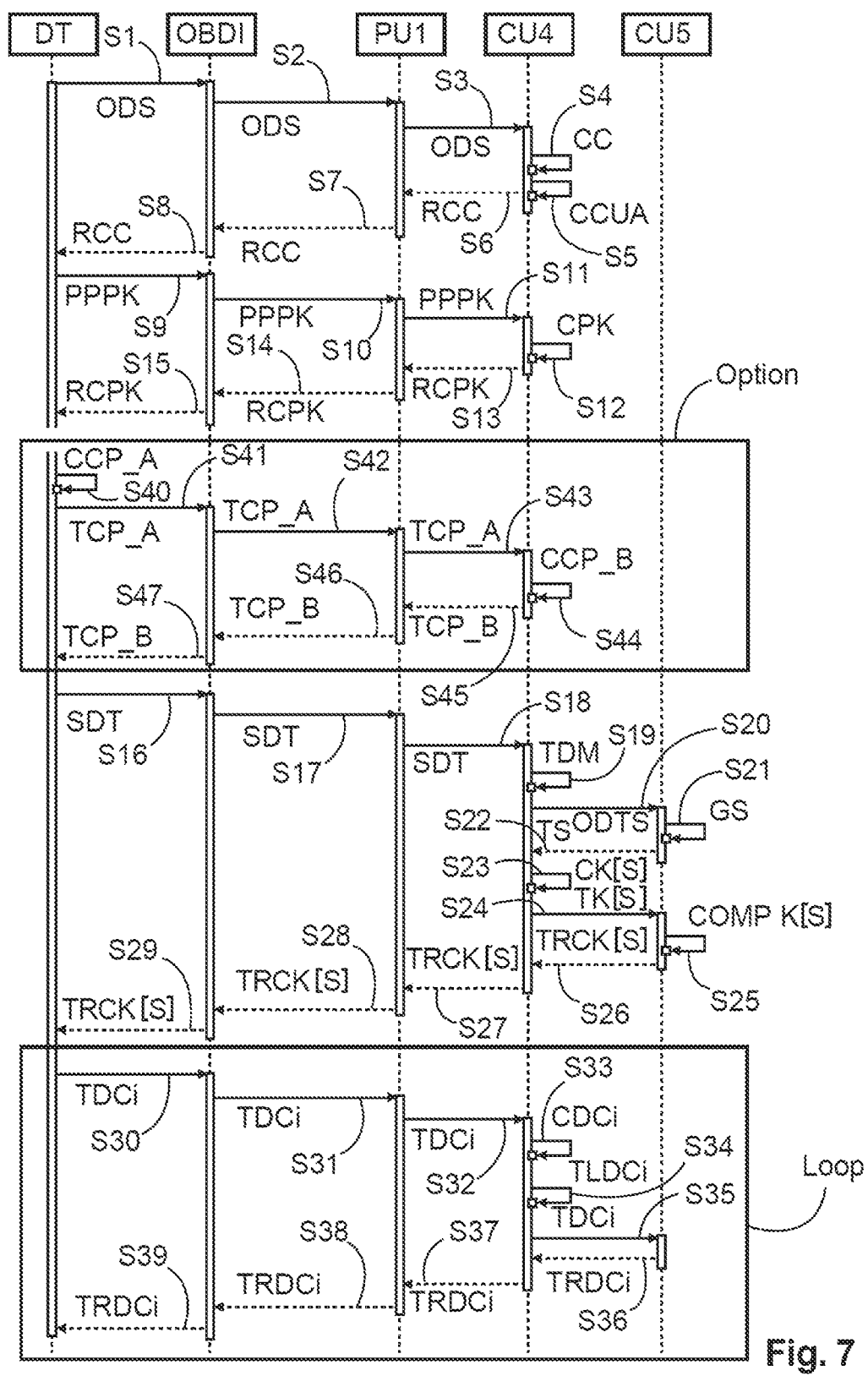
FIG. 7 shows a diagram illustrating the exchange of messages between the control units involved in the process of carrying out a diagnostic test of a legacy control unit with a diagnostic tester connected to the onboard network.

In the example shown in FIG. 7, the gateway device PU1 receives the opening message in step S2 from the diagnostic interface T1. This corresponds to the UDS message with SID 0x29. It is used to initiate the phase for authenticating the diagnostic tester DT. The gateway device PU1 then evaluates the full UDS message. Due to the control unit address of the control unit CU5 to be tested that is contained therein, the gateway device PU1 forwards the message to the connected communication bus B1. The UDS message is converted into a multiplicity of CAN messages that are transmitted via the CAN bus B1. The gateway device PU1 is designed for this type of implementation. In step S3, the opening message is accepted by the secured brake control unit CU4 in a number of CAN messages. As already described, the brake control unit CU4 is provided with a gateway function GWF and additional security equipment SE. The gateway function GWF contains the list of CAN message identifiers that are relevant to the control units arranged in the separate part B1'. When such a message is received by the brake control unit CU4, it is first checked by the secured CAN transceiver. If it is determined here that it is an introduced message, it is immediately rendered harmless. This can be done by transmitting an error flag, as described at the outset. In addition, the messages that are allowed to pass through are checked by the firewall FW. This check takes place in steps S4 and S5 after the UDS message to open the diagnostic session has been received. In step S4, the certificate contained in the UDS message is checked for authenticity. The HSM module HSM is also used for this purpose. If the authenticity of the certificate is not proven here, the diagnostic session is not opened. In step S5, the control unit information transmitted in the UDS message, including address and type, is checked. If an address or another type of the addressed legacy control unit is mentioned here, the diagnostic session is not opened. Thus, the firewall FW, in conjunction with the HSM module and the secured CAN transceiver, wards off spoofing attacks, for example.

If the request of the diagnostic tester has been verified with a certificate and the underlying CAN messages have not been exposed as introduced, the correctness of the checked certificate is confirmed after step S5. First, the secured brake control unit CU4 transmits the confirmation to the central gateway device PU1. The central gateway device PU1 forwards this confirmation to the diagnostic interface, possibly after conversion into the format suitable for the bus B5. The onboard diagnostic interface OBDI forwards the message, with the confirmation of the authenticity of the certificate, to the diagnostic tester DT.

This then performs the next step to open the diagnostic session. This step is denoted with reference sign S9. The diagnostic tester DT transmits a request to prove that it has the private key to the diagnostic interface OBDI. This UDS message contains a signature that was calculated by the diagnostic tester DT using the private key. The control unit addressed should verify that the diagnostic tester DT has the private key. This UDS message is transmitted in step S10 from the diagnostic interface OBDI to the central gateway device PU1. From there, it is in turn transmitted to the brake control unit CU4 in step S11. The brake control unit CU4 checks the authenticity of the calculated signature using the public key of the diagnostic tester DT. The hardware security module HSM can be used for this purpose. The SSH authentication protocol is mentioned as an example of authentication based on this key pair. This is described in Request for Comment RFC 4252. The result of the key check is transmitted back to the diagnostic tester DT in steps S13 to S15. This key check step is required because the certificate is public and therefore can easily fall into the hands of attackers. Therefore, it is necessary to check whether the owner of the certificate actually knows the private key. This check is performed in steps S9 to S15.

When ownership of the private key has been verified, the diagnostic tester DT starts a diagnostic session. In steps S16 to S18, the diagnostic message for starting the diagnostic session is cascaded to the secured control unit CU4. This brake control unit CU4 now converts this UDS message in step S19 to the format valid for the control unit CU5 to be tested after the diagnostic tester DT has authenticated. This depends on the status of the diagnostic tester DT and can be omitted if the diagnostic tester DT already delivers the UDS message in the format that can be understood by the legacy control unit CU5. The CAN messages that are expected by the legacy control unit CU5 for starting the diagnostic session are thus generated in step S20. The diagnostic message transmitted here to start the diagnostic session corresponds to the UDS message with SID 0x27. The control unit CU5 for distance control then generates a so-called "seed". This is a string of characters generated by a random generator. This is done in step S21. In step S22, one part of this string is transmitted as a challenge to the secured control unit CU4 as part of a challenge-response authentication. The brake control unit CU4 supplements the supplied part of the string with its private key and thus calculates the appropriate key according to the agreed cryptological algorithm. This calculation can also be performed in the hardware security module HSM. This is done in step S23. The calculated key is transmitted to the legacy control unit CU5 in step S24. In step S25, the legacy control unit CU5 compares the received key with the key calculated by itself. For this purpose, it uses the same algorithm that works with the generated seed from step S21. The result of the key comparison is returned to the diagnostic tester DT in steps S26 to S29. If the start of the diagnostic session was successful, the diagnostic tester DT transmits the first diagnostic command in step S30. This diagnostic command is routed along the same path and, after steps S31 and S32, reaches the secured control unit CU4. The firewall function FW in the brake control unit CU4 checks the diagnostic command in step S33. This check includes in particular a check as to whether a diagnostic command classified as dangerous is involved. This includes in particular the diagnostic commands "Read Memory by Address" with SID 0x23 and "Write Memory by Address" with SID 0x3D, "Request Download" with SID 0x34 and "Request Upload" with SID 0x35, which can be used for a firmware update. Such diagnostic commands are blocked and are not executed. If a diagnostic command classified as dangerous is not involved, step S34 converts it to the legacy format required for the legacy control unit CU5. In this format, the diagnostic command is transmitted to the legacy control unit CU5 in step S35. The diagnostic command is then processed by the legacy control unit CU5. The result of the check is transmitted to the brake control unit CU4 in step S36. From there, it is forwarded to the diagnostic tester DT in steps S37 to S39. Normally, further diagnostic commands are transmitted by the diagnostic tester DT during the opened diagnostic session and are executed by the legacy control unit CU5. This is indicated in FIG. 7 by the border around steps S30 to S39. This frame is therefore referred to as a "loop" for clarification.

An optional extension is also depicted in FIG. 7, with a border and provided with the label "Option". Whereas, in the method described above, the secured control unit CU4 operates as a diagnostic client after the certificate-based authentication of the diagnostic tester DT and performs the challenge-response authentication common for legacy control units in steps S16 to S29, an additional authentication method can be used after the optional extension to further limit the attack possibilities. After the diagnostic session has been opened, the entire diagnostic communication is then additionally secured in steps S40 to S47. The messages from the diagnostic tester DT are authenticated again for each diagnostic command transmitted during the session. This is done by adding a signature to each diagnostic command. The secured control unit CU4 verifies whether the signature is correct. The UDS message used to agree the session key corresponds to the UDS message with SID 0x84.

In step S40, the diagnostic tester DT calculates a diagnostic session key based on an agreed initial value. In step S41, an agreed part of a session secret is transmitted to the diagnostic interface OBDI. This forwards the message with the part of the session secret to the central gateway PU1 in step S42. In step S43, the gateway device PU1 transmits the message to the brake control unit CU4. In step S44, the session key is calculated in said brake control unit CU4 using that part of the session secret which was agreed for this brake control unit. The performance of the session key calculation is then communicated back in steps S45 to S47. This type of authentication would then take place in the secured brake control unit CU4 in the respective step S33. Communication according to the option for calculating the "shared key" in steps S40 to S47 can be carried out in the manner of the well-known "Diffie-Hellman Key Exchange" method.

In order to protect the control units connected to the vehicle bus B1 against attacks from inside and outside, it is necessary to equip them with secure CAN transceivers. As described at the outset, the secure CAN transceivers can already detect and render introduced messages harmless with measures on the data security layer. An alternative option for protection is to equip the control units connected to the vehicle bus B1 with the so-called Secure Onboard Communication (SecOC). This method ensures authenticated message transmission for in-vehicle communication. This corresponds to the described "Diffie-Hellman Key Exchange" method, which, however, represents a measure related to the UDS diagnostic protocol, i.e. on the higher layers of the OSI reference model.

In order to ensure that no unauthorized modifications to the software stack installed in the secured brake control unit CU4 are possible, it is advantageous if this brake control unit CU4 is equipped with a secure boot manager and a secure update manager for securing a software update. For this purpose, there are commercial offerings for embedded software stacks. In this respect, the AUTOSAR organization has established requirements and rules that should be complied with by such embedded software stacks.

Optionally, the firewall FW in the brake control unit CU4 could be formed with an anomaly detection device that reports when suspicious messages were transmitted to one of the legacy control units networked in the separate part of the vehicle bus B1'. The firewall could then transmit a warning message to the vehicle manufacturer or to an authority. This warning message can be sent via the onboard communication device KU1 or via the onboard communication device KU2.

With the approach outlined, a vehicle manufacturer can demonstrate compliance with the UN-ECE R 155 directive without simultaneously bringing all components in the vehicle to the latest security standard. Most attacks are detected with the solution presented. The residual risk may be classified as "acceptable" for a vehicle not equipped with a fully autonomous driver.

Figure 8:
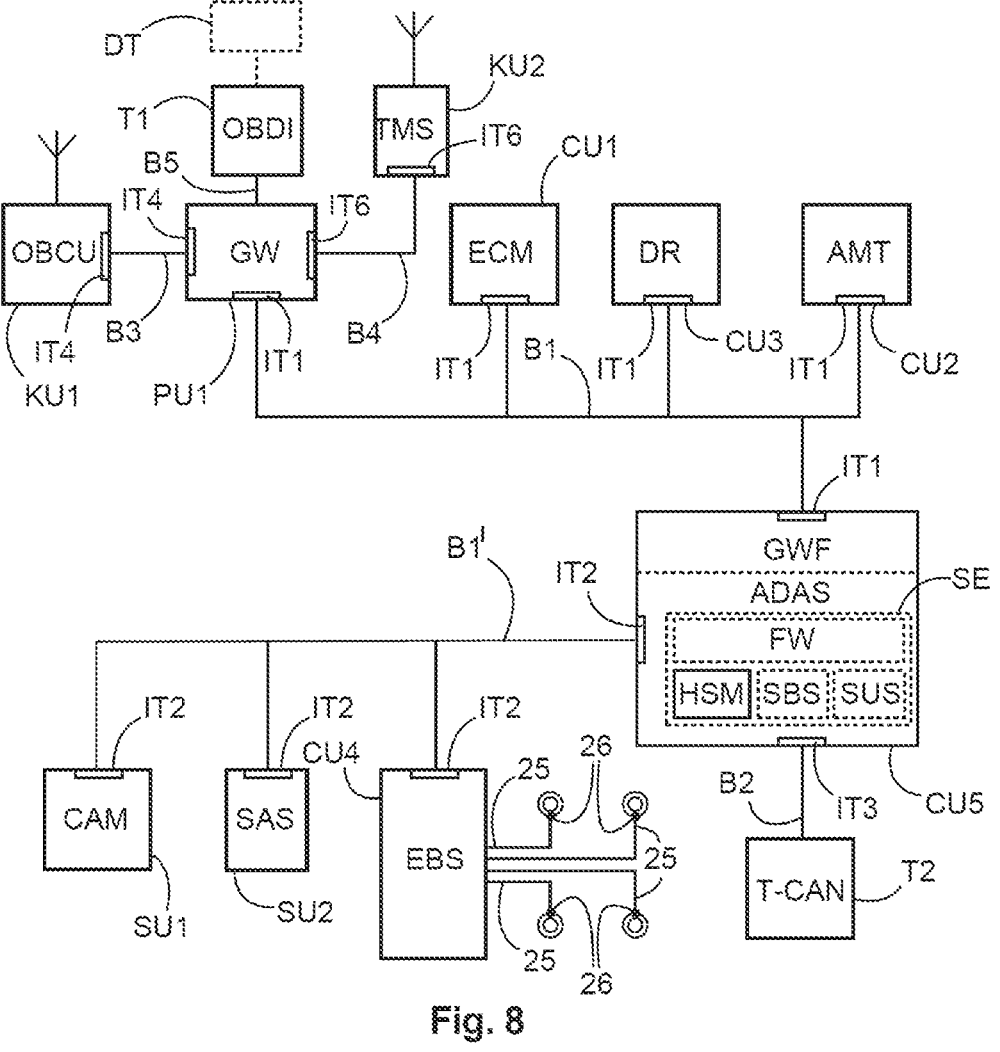
FIG. 8 shows a second block diagram for the electronic equipment of a towing vehicle.

FIG. 8 shows a second exemplary embodiment of a block diagram for the electronic equipment of a towing vehicle. In this, the same reference numbers denote the same components as in FIG. 2. The difference is that the two control units CU4 and CU5 are swapped. In FIG. 8, the secured control unit is the control unit which controls the distance to vehicles in front and includes the radar sensor. A conventional brake control unit CU4 is used as the legacy control unit in the separate part of the vehicle bus B1'. This arrangement in turn makes it possible to operate the control unit network in a manner secured in accordance with the specifications of the UN-ECE directive R155, even though the brake control unit does not yet have any additional security equipment.

It is also possible to network other and/or further legacy control units in the separate part of the vehicle bus B1', which are then also protected from the described attacks, in particular spoofing attacks.

All examples mentioned herein, as well as any conditional wording, should be understood without limitation to such specific examples. For example, it is recognized by experts that the block diagram illustrated here represents a conceptual view of an exemplary circuit arrangement. In a similar manner, it can be recognized that an illustrated flowchart, state transition diagram, pseudocode and the like represent different variants for representing processes that are essentially stored in computer-readable media and thus can be executed by a computer or processor.

It should be understood that the proposed method and associated apparatuses can be implemented in various forms of hardware, software, firmware, specialty processors, or a combination thereof. Specialty processors can include application-specific integrated circuits (ASICs), reduced instruction set computers (RISCs) and/or field programmable gate arrays (FPGAs). Preferably, the proposed method and apparatus are implemented as a combination of hardware and software. The software is preferably installed as an application program on a program memory apparatus. Typically, it is a machine based on a computer platform that has hardware, such as one or more central processing units (CPU), a random access memory (RAM) and one or more input/output (I/O) interface(s). An operating system is also typically installed on the computer platform. The various processes and functions described here can be part of the application program or a part that is executed via the operating system.

The disclosure is not limited to the exemplary embodiments described here. There is room for various adaptations and modifications which would be considered by a person skilled in the art on the basis of his expertise and in association with the disclosure.

LIST OF REFERENCE SIGNS (PART OF THE DESCRIPTION)

10 Trailer vehicle
12 Support
14 Kingpin
20 Towing vehicle
22 Coupling element
24 Drive unit
25, 25' Brake line
26, 26' Service brake
100 CAN node
120 CAN transceiver
130 Terminating resistor
140 CAN controller
150 Twisted two-wire line
160 Host
B1 Vehicle communication bus, first part
B1' Vehicle communication bus, separate part
B2 Second communication bus
B3 Third communication bus
B4 Fourth communication bus
B5 Fifth communication bus
DT Diagnostic tester
IT1-IT6 Various communication interfaces
KU1 Onboard communication module
KU2 Telematics module
CU1 Electronic engine control unit
CU2 Electronic transmission control unit
CU3 Electronic retarder control unit
CU4 Electronic brake control unit
CU5 Electronic driver assistance system
CU6 Electronic brake control unit
FW Firewall
HSM Hardware Security Module
OBDI Diagnostic interface
PU1 Electronic processing unit (gateway)
SE Security equipment
S1-S47 Steps when running a diagnostic session
SU1 Camera
SU2 Steering angle sensor
T1 Diagnostic plug
T2 Connection socket for trailer bus system
T2' Connection plug for trailer bus system

The invention claimed is:
1. An apparatus for secured communication between control units in a vehicle (20), the apparatus comprising:
control units in a first part of a wired vehicle bus system that are each equipped with at least one communication interface, via which the control units are connected to the first part of a wired vehicle bus system (B1) for the purpose of exchanging messages,
wherein a secured control unit is connected to the vehicle bus system (B1) via at least one first communication interface,
wherein the secured control unit has at least one second communication interface, wherein a separate part of the vehicle bus system (B1') is connected to the at least one second communication interface, wherein at least one further control unit is connected in the separate part of the vehicle bus system, and wherein the secured control unit has a gateway function (GWF) and security equipment (SE) that fulfills at least the function of a firewall (FW) that wards off attacks from the first part of the vehicle bus system (B1) on the at least one further control unit disposed in the separate part of the vehicle bus system (B1');

wherein the at least one first communication interface of the secured control unit is a secured CAN bus communication interface that wards off attacks by introduced messages from a manipulated control unit of the control units in the first part of the vehicle bus system;

wherein the wired vehicle bus system (B1) is a CAN bus system, corresponding to a Controller Area Network, according to the SAE J1939 standard;

wherein the at least one communication interface of the control units in the first part of the vehicle bus system (B1) include a secured CAN bus communication interface, wherein the secured CAN bus communication interface is designed in such a way that it wards off attacks caused by introduced messages from a manipulated control unit of the control units in the first part of the vehicle bus system (B1).

2. The apparatus as claimed in claim 1, wherein the gateway function (GWF) of the secured control unit relates to routing of the messages between subscribers in the first part and the separate part of the vehicle bus system (B1, B1').

3. The apparatus as claimed in claim 1, wherein the secured CAN bus communication interfaces of the control units in the first part of the vehicle bus system (B1) are equipped with a secured CAN transceiver (120) or include a software stack designed for secured onboard communication.

4. The apparatus as claimed in claim 1, wherein the at least one secured control unit is a brake control unit EBS, corresponding to an "Electronic Braking System", and the further control units in the separate part of the vehicle bus system (B1') comprise at least one driver assistance system control unit or an environment capture system control unit, to which at least one environment capture sensor (SU1) is connected.

5. A vehicle having a drive unit (24) and a braking system with an electronic control unit, wherein the vehicle (20) has the apparatus as claimed in claim 1.

6. The apparatus as claimed in claim 1, wherein the secured control unit is a driver assistance system control unit, and the further control units in the separate part of the vehicle bus system (B1') comprise a brake control unit EBS, corresponding to an "Electronic Braking System", or an environment capture system control unit, to which at least one environment capture sensor (SU1) is connected.

7. An electronic control unit comprising:

a first communication interface, via which the electronic control unit is configured to be connected to a first part of a wired vehicle bus system (B1) for the purpose of exchanging messages, at least one second communication interface (IT2), to which a separate part of the vehicle bus system (B1') is configured to be connected to the electronic control unit, wherein the electronic control unit includes a gateway function and security equipment (SE) that fulfills at least the function of a firewall (FW) for the purpose of warding off attacks from first control units in the first part of the vehicle bus system (B1) on at least one further control unit in the separate part of the vehicle bus system (B1');

wherein the first communication interface and the at least one second communication interface corresponds to a CAN bus communication interface, corresponding to a Controller Area Network, according to the SAE J1939 standard;

wherein the CAN bus communication interface configured to be connected to the first part of the vehicle bus system (B1) is equipped with a secured CAN transceiver (120) or is provided with a software stack designed for Secured Onboard Communication (SecOC), which wards off attacks caused by introduced messages from a manipulated control unit in the first part of the vehicle bus system (B1).

8. The electronic control unit as claimed in claim 7, wherein the security equipment (SE) further comprises software equipment which performs a secured boot operation.

9. The electronic control unit as claimed in claim 7, wherein the gateway function of the electronic control unit relates to the routing of messages between subscribers in the first part of the vehicle bus system (B1) and the separate part of the vehicle bus system (B1').

10. The electronic control unit as claimed in claim 7, wherein the first communication interface and the at least one second communication interface corresponds to a CAN bus communication interface, corresponding to a Controller Area Network, according to the SAE J1939 standard.

11. The electronic control unit as claimed in claim 7, wherein the security equipment (SE) further has a function for certificate-based authentication of an external diagnostic tester (DT) connected to one of the first control units or a gateway device (PU1) of the first part of the vehicle bus system (B1).

12. The electronic control unit as claimed in claim 11, wherein the security equipment (SE) relates to an HSM module (HSM), corresponding to a Hardware Security Module, that ensures secure authentication at least of the external diagnostic tester (DT).

13. The electronic control unit as claimed in claim 12, wherein the security equipment (SE) further has the function of a diagnostic client control unit for seed key authentication of one of the further control units connected to the separate part of the vehicle bus system (B1') with regard to the execution of diagnostic functions which are called up by communicating with the external diagnostic tester (DT) verified by certificate.

14. The electronic control unit as claimed in claim 13, wherein the security equipment (SE) further has the function of preventing certain diagnostic commands which are classified as dangerous, which arrive from the external diagnostic tester (DT), and which are addressed to the further control unit to be tested in the separate part of the vehicle bus system (B1'), with regard to the reading and writing of memory areas allocated for the execution of computer programs or for the permanent storage of computer programs in non-volatile memory areas.

15. The electronic control unit as claimed in claim 14, wherein the security equipment (SE) further has the function of verifying the incoming diagnostic commands, individually or in groups, by authenticating the external diagnostic tester (DT) again in each case before the relevant diagnostic command is forwarded to the further control unit to be tested in the separate part of the vehicle bus system.

16. The electronic control unit as claimed in claim 15, wherein the security equipment further comprises the function of a secured software update process in which the computer programs stored in the non-volatile memory area are exchanged.

17. The electronic control unit as claimed in claim 7, wherein the electronic control unit is a brake control unit EBS, corresponding to an "Electronic Braking System", a distance control unit for a distance control system, or a driving control unit for an automatic driving system.

* * * * *